3,507,677
BEARING PRETREAT PROCESS
Charles H. Maynard, Framingham, and Herbert B. Singer, Mattapan, Mass., assignors to Massachusetts Institute of Technology, Cambridge, Mass., a corporation of Massachusetts
No Drawing. Continuation of application Ser. No. 404,962, Oct. 19, 1964. This application June 13, 1968, Ser. No. 752,411
Int. Cl. C10m *3/40;* F16c *33/12*
U.S. Cl. 117—127                    6 Claims

ABSTRACT OF THE DISCLOSURE

A process for improving the performance and life of instrument grade steel ball bearings. The bearings are immersed in tricresyl-phosphate for a period sufficient to cause a permanent reduction in low speed friction. The necessary soaking period is reduced by increasing the temperature, however, the temperature should not approach the tempering temperature of the steel. Once satisfactory combinations of soak time and temperature are derived for one set of bearing components, they apply to other bearings of the same steel composition.

---

This application is a continuation of application Ser. No. 404,962, filed Oct. 19, 1964, and now abandoned.

This invention relates generally to the manufacture of ball bearings, and particularly concerns a pretreat process for extending the life of ball bearings, especially instrument grade bearings such as gyro accelerometer and gimbal bearings used in high-precision inertial systems.

As programs for the exploration of space become more ambitious and trajectories penetrate deeper into the environment, the probability of mission success becomes increasingly dependent on the long-term reliability, accuracy, and overall performance of on-board navigation, and guidance systems defining the numerous maneuvers required in successfully executing the mission. Of the available types of navigation and guidance systems, the inertial systems are unique in that they can operate effectively without any external reference information. This feature has obvious advantages in environments such as deep space, where external radiation links are unavailable or unreliable. Almost all inertial navigation and guidance systems employ a stable platform. The platform provides a three-axis reference frame whose orientation remains inertially fixed in space. The platform is suspended in gimbals which provide the necessary isolation and complete rotational freedom from the motion of the vehicle. Precision gyros serve as error-detecting devices in the servo system constraining the orientation of the platform. A space mission may require the gyros and gimbals controlling the platform to comply with pre-set high-performance specifications over a long term. This is because an inertial system is self-contained. Errors developing in this system are cumulative and become increasingly significant as flight time progresses. It is apparent that failure in, or even minute error signals generated by, important units, such as gyros and gimbals, can cause a costly mission to go astray. It should therefore be of no surprise that coextensive with current efforts to develop improved inertial navigation and guidance systems for deep space missions are programs aimed at providing servo systems, gyros, and associative parts that can operate continuously at high-performance levels for as much as 25,000 hours, or nearly three years.

Noteworthy among these programs are developments in the manufacture of gyro spin-axis and gimbal bearings, vital parts of platform control systems. While serving their prime function of supporting the high speed rotor, spin-axis bearings must contribute minimal perturbations of friction torque to the rotor. Perturbations in friction torque generate noncorrectable errors in the control system. Gimbal bearings provide support and rotational freedom to the platform. Friction in these bearings, causes the platform to drift. Of the two bearing types, friction is more pronounced in the gimbal bearings as they are driven at very low speeds. In either case, the errors due to friction increase progressively; and when of such proportion as to interfere with the high performance levels set for the control system, the bearings are said to "fail."

Gyro spin-axis and gimbal ball bearings are also prone to other kinds of "failure." Of the causes, physical wear and chemical reaction between balls and races are particularly noteworthy. These problems generally arise when the bearings are functioning under what is termed the "metal contact mode" of operation; that is, when the bearing is at rest, reversing, or operating at a very low speed. During the "metal contact mode" the bearing races and balls come in physical contact with one another and wear results. Furthermore, chemical reaction between the surfaces results in surface films and impurities. Once occurring, these chemical and physical reactions cause increasing deterioration in bearing performance with time. Moreover, these interactions not only adversely affect gimbal bearings, which for the most part operate only at low speeds, but also introduce friction in and otherwise limit the high-performance life of high speed gyro spin-axis bearings which are also subject to at-rest conditions, for example, during the period between first assembly and actual deployment in an operating system.

Procedures involved during the final stages of bearing manufacture also can be harmful to high performance life. For example, finished bearings are inspected and tested by the manufacturer to determine physical parameters such as dimension, roundness, contact angle, hardness and the like before being sold. Often like testing measures are again employed by the user. Unless the bearings are provided with an effectively protective surface film before-hand, such procedures can permanently damage surfaces and eventually produce consequences similar to those normally occasioned during the "metal contact mode" of operation.

In view of the general demand for improved ball bearings in general, and the particular need for improved high-performance instrument grade bearings, applicants have, as the broad object of their invention, to provide a pretreatment process for increasing the life of ball bearings.

Another object of their invention is to provide a bearing pretreatment process that develops a permanently protective surface film for preventing physical and chemical interactions between bearing balls and races normally ocassioned during periods of handling, non-use or low speed operation.

A further object of the present invention is to provide a process that develops a permanent surface film on balls and races which substantially reduces friction normally attending low speed operation.

A further object of the invention is to provide a process with the forementioned features that may be readily included in the final stages of the volume production of ball bearings.

A specific object of the invention is to provide a process for considerably extending the life of high performance instrument grade bearings, primarily those intended for low speed applications.

Another specific object of the invention is to provide a pretreat process that eliminates perturbating torques in and substantially extends the high-performance life of bearings used in inertial systems.

In accordance with the preferred concept of the invention, the balls and races of manufactured bearings are demagnetized to eliminate residual magnetism and then cleaned. One possible cleaning procedure is to first ultrasonically clean them for five minutes in reagent grade toluene. Next, races and balls are brushed over a vacuum hose, preferably the brush is of camel hair and soaked with toluene. Then, the components are ultrasonically cleaned for about five minutes in tri-chloro-tri-fluoro-ethane and reagent grade methanol successively. They are thereafter dipped into a solution of 50% acetone and 50% methanol. The balls and races are now inspected through a 40× microscope and any film and contamination not removed by the solvents is manually removed with a camel-hair brush soaked in a solution of 50% acetone and 50% methanol over a vacuum hose, or with a pair of soft metal tweezers. The bearing components thusly cleaned, and dried, are pre-conditioned to receive the protective coating. The bearings are next soaked in tricresyl-phosphate at a controlled elevated temperature in a stabilized oven for an appropriate period to be explained below. Upon completion of soak, the bearings are again cleaned in accordance with the steps described above and are then ready for testing by the manufacturer, or ready to be applied to incorporating equipment.

Most broadly defined, a proper combination of soak time and temperature is one which permanently eliminates the deleterious affects accompanying the "metal contact mode" of operation, these being as stated above, physical wear, chemical reaction and friction between the balls and races. Alternatively, a proper combination may be defined as one that produces a permanent reduction in low speed bearing friction. Under either criterion a routine must be followed to determine the optimum conditions of soak time and temperature for bearings of each steel composition. However, once particular parameters of temperature and time are so determined, they hold for other bearings of that composition with virtually no limitation to size or class. The following general principles have also become apparent from tests conducted on a number of bearings. Bearings treated at higher temperatures require shorter soaking periods than bearings treated at lower temperatures, and agitation of the tricresyl phosphate further reduces the necessary soak time. Higher temperatures and prolonged soak periods, however, present certain distinct risks. Desirable metallurigical properties may be lost in bearings soaked at temperatures near the tempering temperature and even in bearings soaked for too long in a temperature range somewhat below the tempering temperature. Consequently, in devising optimum soak conditions for a particular bearing composition, a time-temperature schedule must be worked out which allows enough time for an adequate protective coating without resorting to a dangerously high temperature.

Of the two criteria cited above, reduction in low-speed friction is probably the more convenient standard for application by bearing manufacturers. Applicants found that a comparison of low speed dynamometer measurements, for example a comparison of the one r.p.m. friction level, obtained before and after soaking, provides a good indication as to whether a meaningful and permanent reduction has taken place. Non-pretreated bearings generally fall below acceptable performance levels in less than one hour of operation at one r.p.m. Continued running at this low speed leads to physical destruction very shortly thereafter. On the other hand, many bearings pretreated in accordance with present invention showed no degradation in performance or physical character when driven at one r.p.m. for hours and even a few days. Based upon results obtained from experimentation on 52100 steel gyro spin-axis bearings, indication of permanent friction reduction is demonstrated after two to five hours of successful one r.p.m. running at the pre-set high performance level. Successful running for approximately this period should signify that permanent reduction in low speed friction has likewise occurred in general purpose and instrument grade bearings of other compositions and types. The percentage of diminution in friction varies from bearing to bearing and especially between manufactured lots. This non-uniformity is due to the fact that some bearings have higher levels of friction to begin with. The reason for these results are not fully understood, and applicants do not subscribe to any particular theory to explain the cause. However, while experimenting with a number of the 52100 steel bearings permanent friction reduction of up to fifty percent resulted.

While the foregoing principles of the invention are equally applicable in the manufacture of general purpose and instrument grade bearings of various types and compositions, as stated above, they were thoroughly demonstrated on gyro spin-axis bearings made of S.A.E Standard 52100 steel and non-passivated AISI 440C stainless steel. The sampling of 52100 steel bearings is particularly significant to instrument bearing manufacturers because, to the best knowledge of applicants, a large proportion of instrument grade bearings are made of 52100 steel, although not all comply with the high quality standards set for gyro spin-axis bearings explained below. Applicants specifically applied the friction testing criterion described above in deriving optimum parameters of soak time and temperature. Test data from many samples indicated that pretreat time for the 52100 bearings previously tempered at temperatures upwards from approximately 300° F. and subsequently heated at 225° F. in tricresyl phosphate on the average was fifteen days. For the stainless steel bearings optimum parameters averaged at three days of soaking in tricresyl phospshate at 225° F. These parameters of temperature and time should hold for other classes of bearings made of the same steel material. It is moreover considered that these parameters are accommodating to production line procedures adopted by ball bearing manufacturers.

Many 52100 gyro spin-axis bearings pretreated in accordance with the invention were successfully operated at 1 r.p.m. for more than one hour and up to a number of days at acceptably low friction levels. Moreover, upon disassembly visual inspection revealed almost no physical change in the races and balls, in fact, peripheral lap marks in most cases were still clearly visible. Other pretreated bearings were operated in gyros running at normal operating speeds in the order of 24,000 r.p.m. The gyros were started and stopped hundreds of times to simulate "metal contact mode" conditions. Periodic milli-wattmeter tests revealed that bearings were operating well within preset high-performance levels. In fact, one pair of bearings was operated at high performance for more than 10,000 hours (well over one year) before the run was voluntarily stopped to permit the inspection and evaluation of components. On the basis of visual inspection and evaluation of test data compiled during the run, the conclusion reached was that the bearings could have operated many thousands of additional hours at high performance had they remained on life test.

It is to be recognized that only top-quality bearings, complying with the highest quality control and screening standards set for gyro spin-axis applications and as defined by the most reputable bearing manufacturers were used in gyros performing the above mentioned tests. Critical bearing parameters, such as roundness and cross-curvature were within very close tolerances. The prescribed standards also limited surface asperites to a minimum particularly in the wear track area. Further consistent with high standards set for cleanliness, bearing material was limited to only single-vacuum-melt metals. Even though high performance bearings were used, nonetheless, these substantially out-performed most bearings of equivalent quality but that were not soaked before hand. The very favorable test results for gyro spin-axis bearings are merely cited as indications and not representations of improvements in low speed operation, overall performance, and life to be expected in pretreated bearings of other types. Inherent bearing quality still remains a major determinant of how well the bearings will perform.

While optimum parameters of time and temperature have been defined above in connection with the process, it should be understood that slight departures may be made and yet remain within the intended scope of the invention. For example, bearings treated for a fraction of a day more or less than the designated fifteen and three-day intervals at temperatures very close to 225° F. also have greatly improved life characteristics. However, it is felt that these slight parameter variations should fall within the scope of the invention as they are consistent with the fact that the composition of the bearing steel varies minutely from bearing to bearing and therefore no single precise set of parameters proves optimum for all bearings of a given category. It is also pointed out that other techniques for cleaning the bearings, other than the one described, may suitably precondition the bearing surfaces. It is comprehended by the appended claims, however, to cover any such modifications that fall within the true spirit and scope of the invention.

What is claimed is:

1. A process for pretreating a ball bearing made of SAE 52100 steel said bearing having an initial level of low speed friction, said process comprising:

immersing said bearing in tricresylphosphate and heating said immersed bearing at a temperature sufficiently below the tempering temperature of the steel so as to avoid destroying favorable metallurgical properties and for a period sufficient to reduce permanently said friction below said initial level.

2. A process as defined in claim 1 wherein said bearing is heated at a temperature of approximately 225° F. for approximately fifteen days.

3. A process for pretreating ball bearing components made of SAE 52100 steel, comprising the steps of:

ultrasonically cleaning said bearing components in reagent grade toluene, thereafter vacuum drying said components, ultrasonically cleaning said components in tri-chloro-tri-fluoro-ethane, thereafter vacuum drying said components, ultrasonically cleaning said components in reagent grade methanol, thereafter vacuum drying said components, dipping said components into a solution of 50% acetone and 50% methanol, thereafter vacuum drying said components, immersing said bearing components in tricresylphosphate, and heating said immersed components at a temperature of approximately 225° F. for approximately fifteen days.

4. A process for pretreating a ball bearing composed of non-passivated AISI 440C stainless steel said bearing having an initial level of low speed friction comprising the steps of:

immersing said bearing in tricresylphosphate and heating said immersed bearing at a temperature sufficiently below the tempering temperature of the steel so as to avoid destroying favorable metallurgical properties and for a period to reduce permanently said low speed friction below said initial level.

5. A process as defined in claim 4 wherein said bearing is heated at a temperature of approximately 225° F. for approximately three days.

6. A process for pretreating ball bearing components composed of non-passivated AISI 440C stainless steel, comprising the steps of:

ultrasonically cleaning said bearing components in reagent grade toluene, thereafter vacuum drying said components, ultrasonically cleaning said components in tri-chloro-tri-fluoro-ethane, thereafter vacuum drying said components, ultrasonically cleaning said components in reagent grade methanol, thereafter vacuum drying said components, dipping said components into a solution composed of 50% acetone and 50% methanol, thereafter vacuum drying said components, immersing said components in tricresylphosphate, and heating said immersed components at a temperature of approximately 225° F. for approximately three days.

References Cited

UNITED STATES PATENTS

| 1,428,084 | 9/1922 | Gravell | 117—49 |
| 2,080,299 | 5/1937 | Benning et al. | 148—6.15 |
| 2,224,695 | 12/1940 | Prutton | 148—6.15 |
| 2,622,993 | 12/1952 | McCullough et al. | 117—49 |
| 3,400,023 | 9/1968 | McDonald | 148—6.15 |

ALFRED L. LEAVITT, Primary Examiner

J. R. BATTEN, Jr., Assistant Examiner

U.S. Cl. X.R.

148—6.15; 252—12, 49.8